(12) United States Patent
Kelly et al.

(10) Patent No.: US 10,874,247 B2
(45) Date of Patent: Dec. 29, 2020

(54) SOLENOID VALVE FOR AIRCRAFT GALLEY BREWING APPARATUS

(71) Applicant: Rockwell Collins, Inc., Cedar Rapids, IA (US)

(72) Inventors: Luke E. Kelly, Basehor, KS (US); Byron A. Devlin, Kansas City, MO (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 131 days.

(21) Appl. No.: 16/023,404

(22) Filed: Jun. 29, 2018

(65) Prior Publication Data

US 2020/0000275 A1    Jan. 2, 2020

(51) Int. Cl.
| | | |
|---|---|---|
| *C23F 15/00* | (2006.01) | |
| *A47J 31/46* | (2006.01) | |
| *C25F 3/24* | (2006.01) | |
| *F16K 31/06* | (2006.01) | |

(52) U.S. Cl.
CPC ............. *A47J 31/461* (2018.08); *C23F 15/00* (2013.01); *C25F 3/24* (2013.01); *F16K 31/06* (2013.01)

(58) Field of Classification Search
CPC ........ F16K 27/029; F16K 31/02; F16K 31/06; F16K 31/0624; F16K 31/0648; F16K 61/0658
See application file for complete search history.

(56) References Cited

U.S. PATENT DOCUMENTS

| | | | |
|---|---|---|---|
| 3,421,546 A * | 1/1969 | Jennings ............. | F16K 31/0658 137/523 |
| 3,549,119 A | 12/1970 | Sellers | |
| 4,357,229 A * | 11/1982 | Bearden, Jr. ............ | B01J 37/08 208/108 |
| 2009/0224613 A1 | 9/2009 | Shimao et al. | |
| 2011/0128103 A1 | 6/2011 | Baba et al. | |
| 2011/0226975 A1* | 9/2011 | Buse ................... | F16K 31/0658 251/129.15 |
| 2012/0168655 A1* | 7/2012 | Chuang .................... | F16K 1/38 251/129.15 |

(Continued)

FOREIGN PATENT DOCUMENTS

FR    2696806 A1    4/1994

OTHER PUBLICATIONS

Extended Search Report dated Nov. 25, 2019 for EP Application No. 19181651.1.

*Primary Examiner* — Kelsey E Cary
(74) *Attorney, Agent, or Firm* — Suiter Swantz pc llo

(57) ABSTRACT

The solenoid valve may include a coil, a stem core tube, and a core. The coil may include one or more electrical leads configured to provide the coil with an electric current. The coil may be configured to convert the electric current to a magnetic field. At least a portion of the stem core tube may be insertable within a coil channel. At least a portion of the core may be insertable within an end of the stem core tube and may be moveable within the stem core tube via the magnetic field. At least one of the stem core tube or the core may be fabricated from 434 stainless steel and treated with one or more corrosion prevention processes. The solenoid valve may be couplable to one or more components of the brewing apparatus. The brewing apparatus may be dimensioned to fit within a compartment of the aircraft galley.

12 Claims, 10 Drawing Sheets

(56) References Cited

U.S. PATENT DOCUMENTS

| | | | | |
|---|---|---|---|---|
| 2013/0032740 A1* | 2/2013 | Ro | ................. | F16K 31/404 |
| | | | | 251/129.15 |
| 2013/0174743 A1* | 7/2013 | Kelly | ................. | A47J 31/005 |
| | | | | 99/291 |
| 2013/0319546 A1* | 12/2013 | Tung | ................. | F16K 27/029 |
| | | | | 137/487.5 |
| 2014/0042353 A1* | 2/2014 | Lee | ................. | F16K 31/06 |
| | | | | 251/129.15 |
| 2014/0084195 A1* | 3/2014 | Hakoda | ............. | F16K 31/0655 |
| | | | | 251/129.15 |
| 2014/0191614 A1* | 7/2014 | Gerhart | ............. | H01L 37/02 |
| | | | | 310/306 |
| 2015/0377376 A1* | 12/2015 | Lappan | ............. | F16K 15/18 |
| | | | | 251/129.15 |
| 2017/0350517 A1* | 12/2017 | Dietz | ................. | A47J 31/461 |
| 2018/0023614 A1* | 1/2018 | Andersson | ........... | B21D 53/22 |
| | | | | 411/545 |

* cited by examiner

SOLENOID VALVE FOR AIRCRAFT GALLEY BREWING APPARATUS

BACKGROUND OF THE INVENTION

Select brewing apparatuses utilized in aircraft and aerospace applications include one or more solenoid valves to control fluid flow. The solenoid valves may be configured to start and/or stop fluid flow, control fluid flow rate, mix multiple fluids, dose a fluid with an additional fluid, distribute fluids to fill reservoirs in the brewing apparatuses, and/or direct steam, heated fluid, and/or cold fluid to brewing systems within the brewing apparatuses.

A solenoid valve includes a valve for controlling fluid flow, where the valve is electromechanically-actuated by a solenoid. When an electric current is applied to the solenoid, a magnetic field is generated that provides a force to a ferrous magnetic operator (e.g., a core), which directly or indirectly changes the position of the valve (e.g., between open, closed, and/or diverting).

Airlines and aerospace manufacturers may utilize cleaning agents and sanitation agents including sodium hypochlorite (e.g., bleach), citrus bases, de-scaling chemicals, or the like. When passed through the brewing apparatus, the cleaning agents and sanitation agents may be harmful to the solenoid valve, causing and/or accelerating the corrosion of select components within the solenoid valve. In turn, the corrosion affects the quality of water that passes through the solenoid valve and subsequently affects the quality of the brewed product.

SUMMARY

In one aspect, the inventive concepts disclosed herein are directed to a solenoid valve for an aircraft galley brewing apparatus. The solenoid valve may include a coil. The coil may include one or more electrical leads. The one or more electrical leads may be configured to provide the coil with an electric current. The coil may be configured to convert the electric current to a magnetic field. The solenoid valve may include a stem core tube. At least a portion of the stem core tube may be insertable within a coil channel. The solenoid valve may include a core. At least a portion of the core may be insertable within an end of the stem core tube. The core may be moveable within the stem core tube via the magnetic field. At least one of the stem core tube or the core may be fabricated from 434 stainless steel and treated with one or more corrosion prevention processes. The solenoid valve may be installable within the brewing apparatus and couplable to one or more components of the brewing apparatus. The brewing apparatus may be dimensioned to fit within a compartment of the aircraft galley.

In a further aspect, the inventive concepts disclosed herein are directed to a solenoid valve for an aircraft galley brewing apparatus. The solenoid valve may include a coil. The coil may include one or more electrical leads. The one or more electrical leads may be configured to provide the coil with an electric current. The coil may be configured to convert the electric current to a magnetic field. The solenoid valve may include a core tube. At least a portion of the core tube may be insertable within a coil channel. The solenoid valve may include a stem. At least a portion of the stem may be insertable within the coil channel. At least a portion of the stem may be insertable within an end of the core tube. The solenoid valve may include a core. At least a portion of the core may be insertable within an additional end of the core tube. The core may be moveable within the core tube via the magnetic field. At least one of the core tube or the core may be fabricated from 434 stainless steel and treated with one or more corrosion prevention processes. The solenoid valve may be installable within the brewing apparatus and couplable to one or more components of the brewing apparatus. The brewing apparatus may be dimensioned to fit within a compartment of the aircraft galley.

In a further aspect, the inventive concepts disclosed herein are directed to a solenoid valve. The solenoid valve may include a coil. The coil may include one or more electrical leads. The one or more electrical leads may be configured to provide the coil with an electric current. The coil may be configured to convert the electric current to a magnetic field. The solenoid valve may include a stem core tube. At least a portion of the core tube may be insertable within a coil channel. The solenoid valve may include a core. At least a portion of the core may be insertable within an end of the stem core tube. The core may be moveable within the stem core tube via the magnetic field. At least one of the stem core tube or the core may be fabricated from 434 stainless steel and treated with one or more corrosion prevention processes.

In a further aspect, the inventive concepts disclosed herein are directed to a solenoid valve. The solenoid valve may include a coil. The coil may include one or more electrical leads. The one or more electrical leads may be configured to provide the coil with an electric current. The coil may be configured to convert the electric current to a magnetic field. The solenoid valve may include a core tube. At least a portion of the core tube may be insertable within a coil channel. The solenoid valve may include a stem. At least a portion of the stem may be insertable within the coil channel. At least a portion of the stem may be insertable within an end of the core tube. The solenoid valve may include a core. At least a portion of the core may be insertable within an additional end of the core tube. The core may be moveable within the core tube via the magnetic field. At least one of the core tube or the core may be fabricated from 434 stainless steel and treated with one or more corrosion prevention processes.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
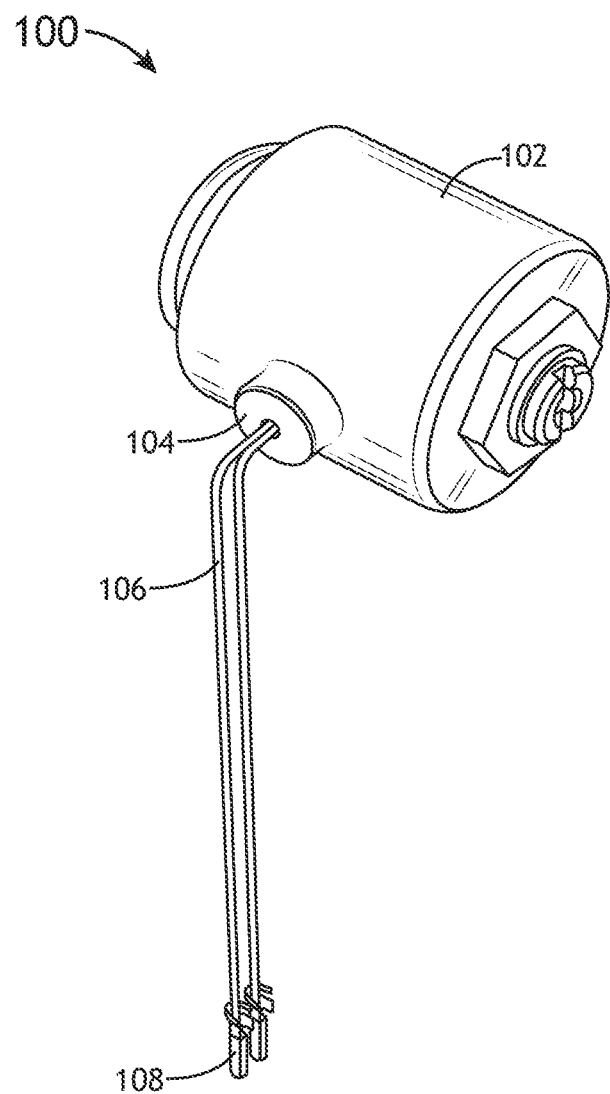
FIG. 1 is an isometric view of an exemplary embodiment of a solenoid valve for an aircraft galley brewing apparatus according to the inventive concepts disclosed herein.

Reference will now be made in detail to the subject matter disclosed, which is illustrated in the accompanying drawings.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

FIGS. 1-10 generally illustrate exemplary embodiments of a solenoid valve 100 according to the inventive concepts disclosed herein.

Broadly, embodiments of the inventive concepts disclosed herein are directed to a solenoid valve for a brewing apparatus. More particularly, embodiments of the inventive concepts disclosed herein are directed to a solenoid valve for a brewing apparatus, where the brewing apparatus is configured to couple to and operate in an aircraft galley, where the solenoid valve includes one of more components treated with one or more corrosion-prevention processes to prevent corrosion of the components by cleaning agents and sanitation agents and reduce cost of the solenoid valve.

FIG. 1 generally illustrates an exemplary embodiment of the solenoid valve 100 according to the inventive concepts disclosed herein.

The solenoid valve 100 may include a coil 102 (e.g., bobbin). The coil 102 may include wound electrical wire within a housing. The housing of the coil 102 may be any three-dimensional shape known in the art. For example, the coil 102 may be a cylinder. By way of another example, the coil 102 may be any prism shape known in the art including, but not limited to, a cube, rectangular prism, hexagonal prism, or the like. Generally, the coil 102 may be any three-dimensional shape known in the art.

The coil 102 may include a set of one or more holes 104. For example, where the coil 102 is a cylinder, the set of one or more holes 104 may be located in a curved exterior surface of the coil 102. The set of one or more holes 104 may be located in a raised or extruded portion of a surface of the coil 102. It is noted herein, however, that the set of one or more holes 104 may be located within the plane of the surface of the coil 102. Therefore, the above description should not be interpreted as a limitation on the present disclosure but merely an illustration.

The solenoid valve 100 may include one or more electrical leads 106. The one or more electrical leads 106 may be inserted into the set of one or more holes 104. The one or more electrical leads 106 may be shielded and/or housed within rigid guides or sleeves. The one or more electrical leads 106 may include one or more lead pins 108. For example, the one or more lead pins 108 may secure the one or more electrical leads 106 to other components of the brewing apparatus in which the solenoid valve 100 is installed.

Figure 2:
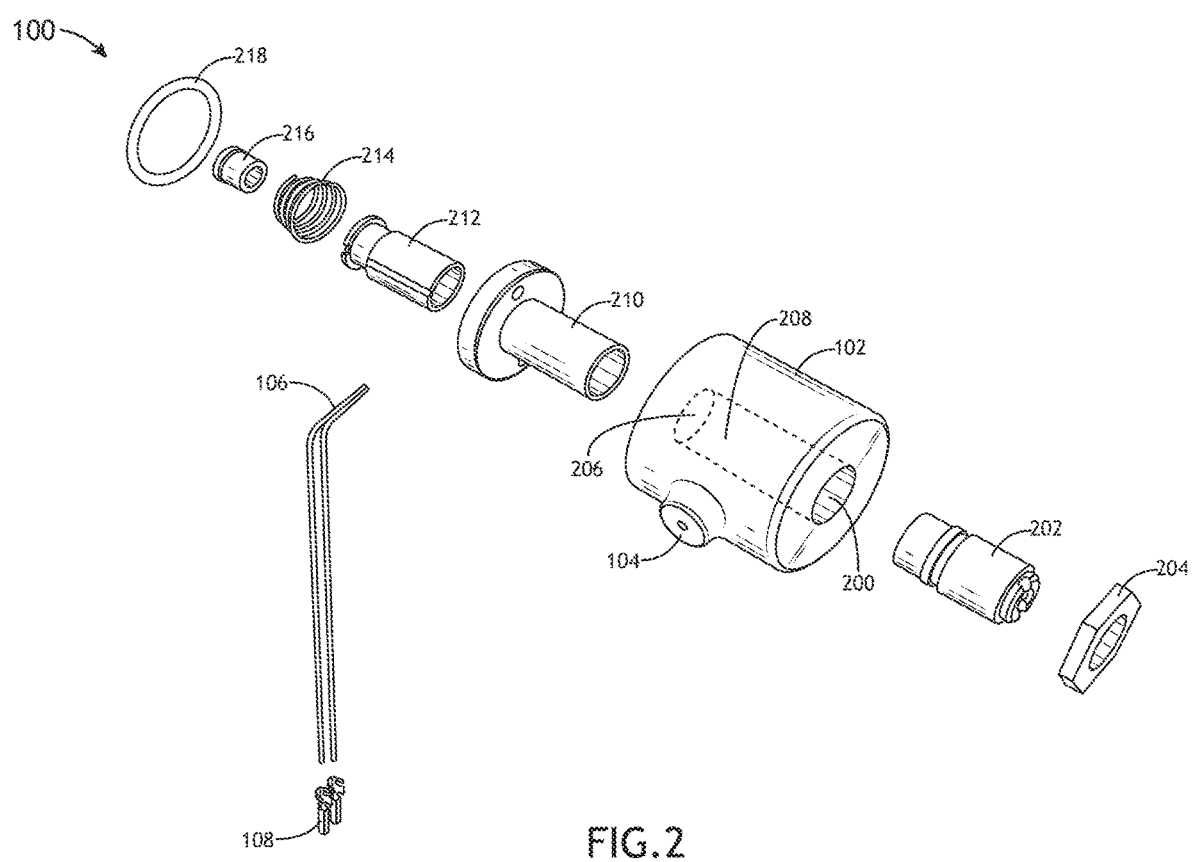
FIG. 2 is an exploded view of an exemplary embodiment of a solenoid valve for an aircraft galley brewing apparatus according to the inventive concepts disclosed herein.

FIG. 2 illustrates an exemplary embodiment of the solenoid valve 100 according to the inventive concepts disclosed herein.

The coil 102 may include a hole 200. For example, where the coil 102 is a cylinder, the hole 200 may be located in a first end of the coil 102 and the set of one or more holes 104 may be located in the curved exterior surface of the coil 102. It is noted herein that the hole 200 may be located in the first end of the coil 102, while the set of one or more holes 104 may be located in a second end of the coil 102 opposite the first end including the hole 200. Therefore, the above description should not be interpreted as a limitation on the present disclosure but merely an illustration.

The solenoid valve 100 may include a stem 202 (e.g., plugnut). The stem 202 may be inserted into the coil 102 via the hole 200. For example, the hole 200 may be located on an end of the coil 102 such that the stem 202 is co-axial (e.g., shares a central axis) with the coil 102 when inserted. The stem 202 may be held in place within the coil 102 via a retainer 204 (e.g., a nut, clip, or the like). In this regard, the stem 202 may be considered a fixed core of the solenoid valve 100 (or a portion thereof).

The coil 102 may include a hole 206. For example, the hole 200 may be located in a first surface of the coil 102, the hole 206 may be located in a second surface of the coil 102, and the set of one or more holes 104 may be located in a third surface of the coil 102. For instance, where the coil 102 is a cylinder, the hole 200 may be located in the first end of the coil 102, the hole 206 may be located in the second end of the coil 102 opposite the end including the hole 200, and the set of one or more holes 104 may be located in the curved exterior surface of the coil 102. It is noted herein that the hole 200 may be located in the first end of the coil 102, while the hole 206 and the set of one or more holes 104 may be located in the second end of the coil 102 opposite the first end including the hole 200. Therefore, the above description should not be interpreted as a limitation on the present disclosure but merely an illustration.

The hole 200 and the hole 206 may be connected via a channel 208. For example, the channel may be cylindrical. By way of another example, the channel may include one or more sections, where the one or more sections include a selected diameter.

The solenoid valve 100 may include a core tube 210 (e.g., plunger tube, plunger guide, guide tube, or the like). The core tube 210 may be inserted into the channel coil 102 via the hole 206. For example, the hole 206 may be located on an end of the coil 102 such that the core tube 210 is co-axial with the coil 102 when inserted.

The stem 202 (or a portion thereof) may be inserted into an end of the core tube 210 within the channel 208. For example, an outer diameter of the stem 202 (or a portion thereof) may be less than an inner diameter of the core tube 210 (or a portion thereof). The core tube 210 may be coupled to the stem 202. For example, the core tube 210 may be attached onto an edge of the stem 202 via crimping, welding, one or more fasteners (e.g., pins), an adhesive, or the like. For instance, attaching the core tube 210 to the stem 202, where the stem 202 is held in place within the coil 102 via the retainer 204, may result in the core tube 210 being held in place within the coil 102. In this regard, the core tube 210 may be considered a fixed core of the solenoid valve 100 (or a portion thereof).

It is noted herein that attaching the core tube 210 to the stem 202 via crimping, welding, fasteners, adhesive, or the like may damage the stem 202 and/or the core tube 210 (e.g., removing an oxide layer from a surface of the stem 202 and/or the core tube 210), providing a location for corrosion. In addition, it is noted herein that the stem 202 may not be attached to the core tube 210. Therefore, the above description should not be interpreted as a limitation on the present disclosure but merely an illustration.

The solenoid valve 100 may include a core 212 (e.g., plunger, armature, or the like). The core 212 may be inserted into an end of the core tube 210. For example, an outer diameter of the core 212 (or a portion thereof) may be less than the inner diameter of the core tube 210 (or a portion thereof). By way of another example, the core 212 may be co-axial with the core tube 210 when inserted.

The solenoid valve 100 may include a spring 214. The spring 214 may re-position the core 212 such that the solenoid valve 100 is closed when the solenoid valve 100 is not energized. The solenoid valve 100 may include a core plug 216. The core plug 216 may be inserted into an end of the core 212. For example, the outer diameter of the core plug 216 (or a portion thereof) may be less than the inner diameter of the core 212 (or a portion thereof). By way of another example, the core plug 216 may be co-axial with the core 212 when inserted. The solenoid valve 100 may include a seal 218 (e.g., O-ring, or the like).

Figure 3:
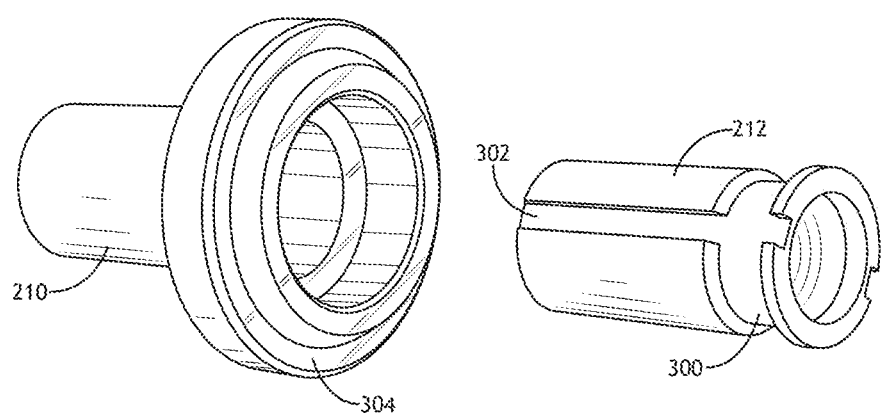
FIG. 3 is a partial exploded view of an exemplary embodiment of a solenoid valve for an aircraft galley brewing apparatus according to the inventive concepts disclosed herein.

FIG. 3 illustrates an exemplary embodiment of the core tube 210 and the core 212 of the solenoid valve 100 according to the inventive concepts disclosed herein.

The core 212 may include a groove 300. For example, the groove 300 may be inset in an exterior surface of the core 212 (e.g., the curved surface, where the core 212 is cylindrical) a selected depth. The core 212 may include a set of one or more grooves 302. For example, the set of one or more grooves 302 may be inset in an exterior surface of the core 212 (e.g., the curved surface, where the core 212 is cylindrical) a selected depth. By way of another example, the set of one or more grooves 302 may be parallel with the central axis of the core 212.

The core tube 210 may include a first section with a first exterior diameter and an additional section with an additional exterior diameter. For example, the first section may be a tube and the second section may be a flange. The core tube 210 may include a groove 304. For example, the groove 304 may be inset in the additional section including the additional exterior diameter a selected depth. It is noted herein, however, that the core tube 210 may include a single exterior diameter. Therefore, the above description should not be interpreted as a limitation on the present disclosure but merely an illustration.

Figure 4:
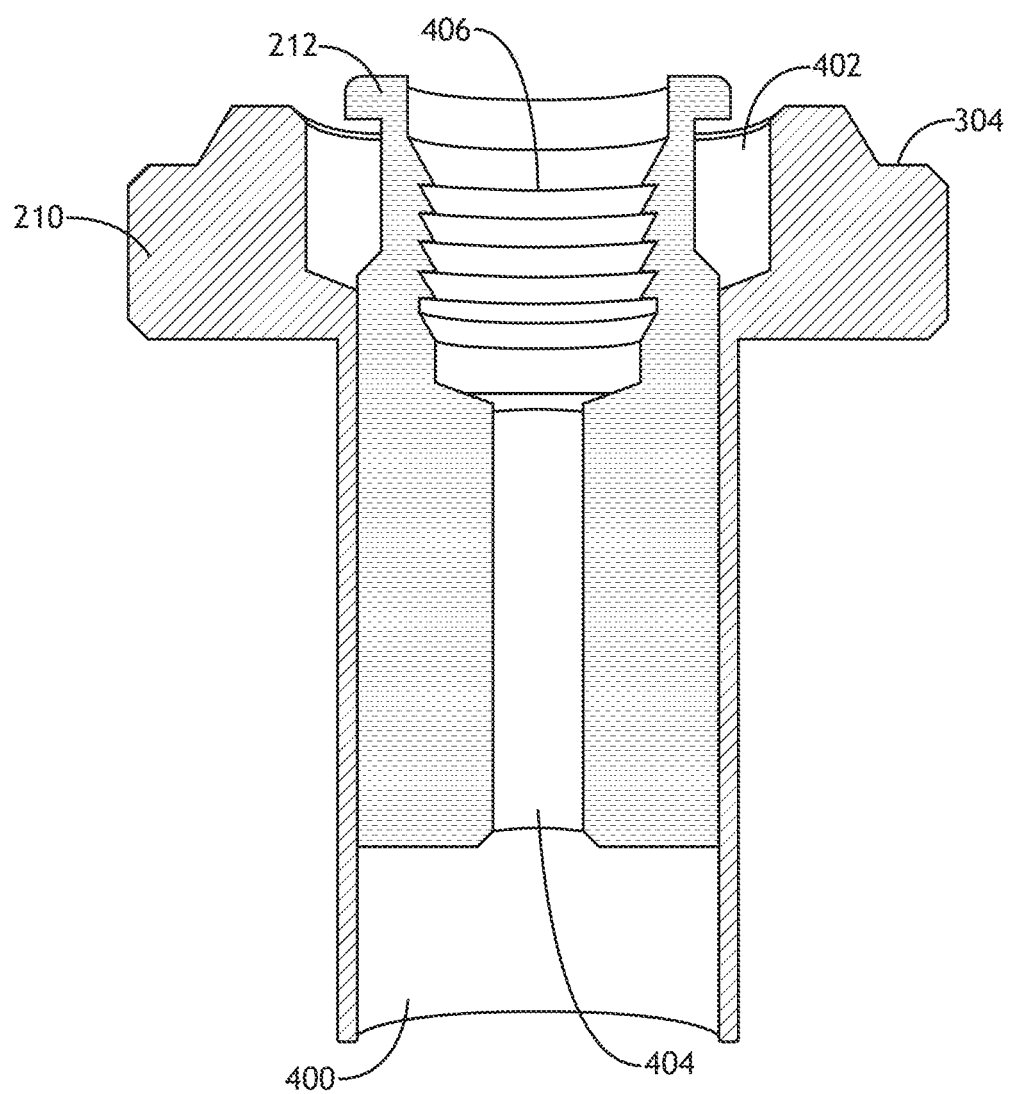
FIG. 4 is a partial cross-section view of an exemplary embodiment of a solenoid valve for an aircraft galley brewing apparatus according to the inventive concepts disclosed herein.

FIG. 4 illustrates an exemplary embodiment of the core tube 210 and the core 212 of the solenoid valve 100 according to the inventive concepts disclosed herein.

The core tube 210 may include a channel 400. The channel 400 may include a first interior diameter and an additional interior diameter. For example, the additional interior diameter may be larger than the first interior diameter. By way of another example, the additional interior diameter may be at the end of the core tube 210 where the core 212 is inserted into the core tube 210. For instance, the additional interior diameter of the core tube 210 may be large enough that there is a gap or space 402 between the core tube 210 and the core 212 for a length of the core 212 within the additional section of the core tube 210 including the additional diameter. It is noted herein, however, that the core tube 210 may include a single interior diameter. Therefore, the above description should not be interpreted as a limitation on the present disclosure but merely an illustration.

The core 212 may include a channel 404. The channel 404 may include a first interior diameter and an additional interior diameter. For example, the additional interior diameter may be larger than the first interior diameter. By way of another example, the additional interior diameter may be at the end of the core 212 where the core plug 216 is inserted into the core 212. The core 212 may include a set of threads or ridges 406. For example, the set of thread or ridges may ring the section of the core 212 with the additional interior diameter.

Figure 5:
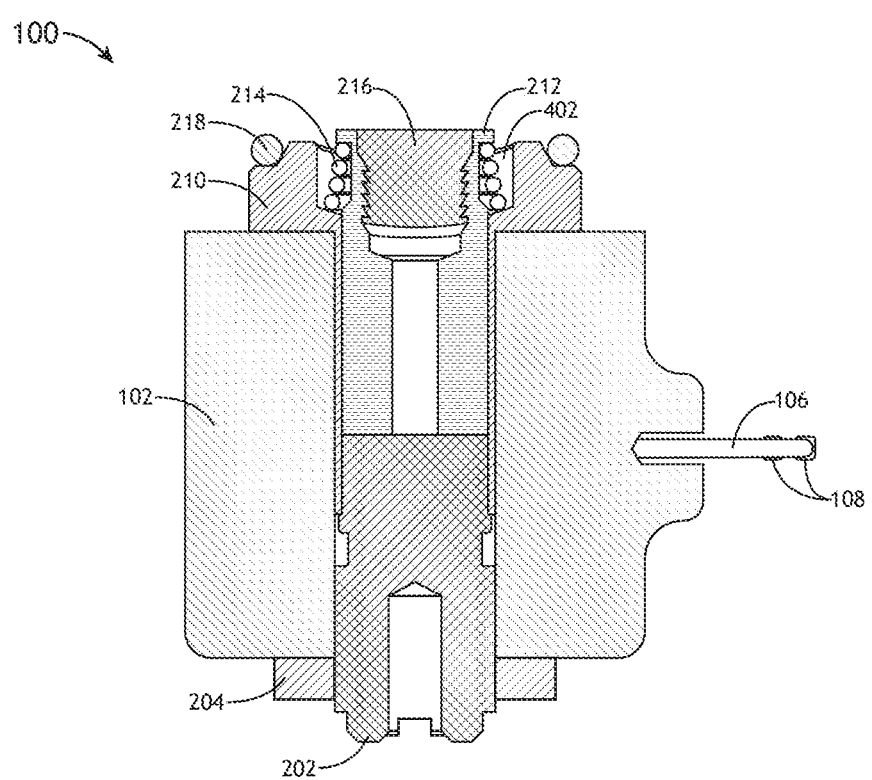
FIG. 5 is a cross-section view of an exemplary embodiment of a solenoid valve for an aircraft galley brewing apparatus according to the inventive concepts disclosed herein.

FIG. 5 illustrates an exemplary embodiment of the solenoid valve 100 according to the inventive concepts disclosed herein.

The spring 214 may be inserted into the gap or space 402 between the core tube 210 and the core 212 for the length of the core 212 within the section of the core tube 210 including the additional interior diameter. The core plug 216 may engage the set of threads or ridges 406 when inserted into the end of the core 212. The seal 218 may be seated within the groove 304 inset within the core tube 210. For example, the seal 218 may be seated within the groove 304 and positioned between the core tube 210 and a manifold, where the solenoid valve 100 is installed on the manifold.

The core 212 may move within the core tube 210. For example, the core 212 may be magnetic, such that the core 212 is provided with a force when the solenoid valve 100 is provided with an electrical current that is converted to a magnetic field. In turn, the force provided to the core 212 may directly or indirectly change the position of the solenoid valve 100 (e.g., to open, closed, diverting, or the like). Movement of the core 212 within the core tube 210 may open, close, and/or divert fluid flow to fluid channels. It is noted herein that one or more of the set of one or more grooves 302, the channel 400, the gap or space 402, and/or the channel 404 may be configured to direct fluid through the solenoid valve 100.

Figure 6:
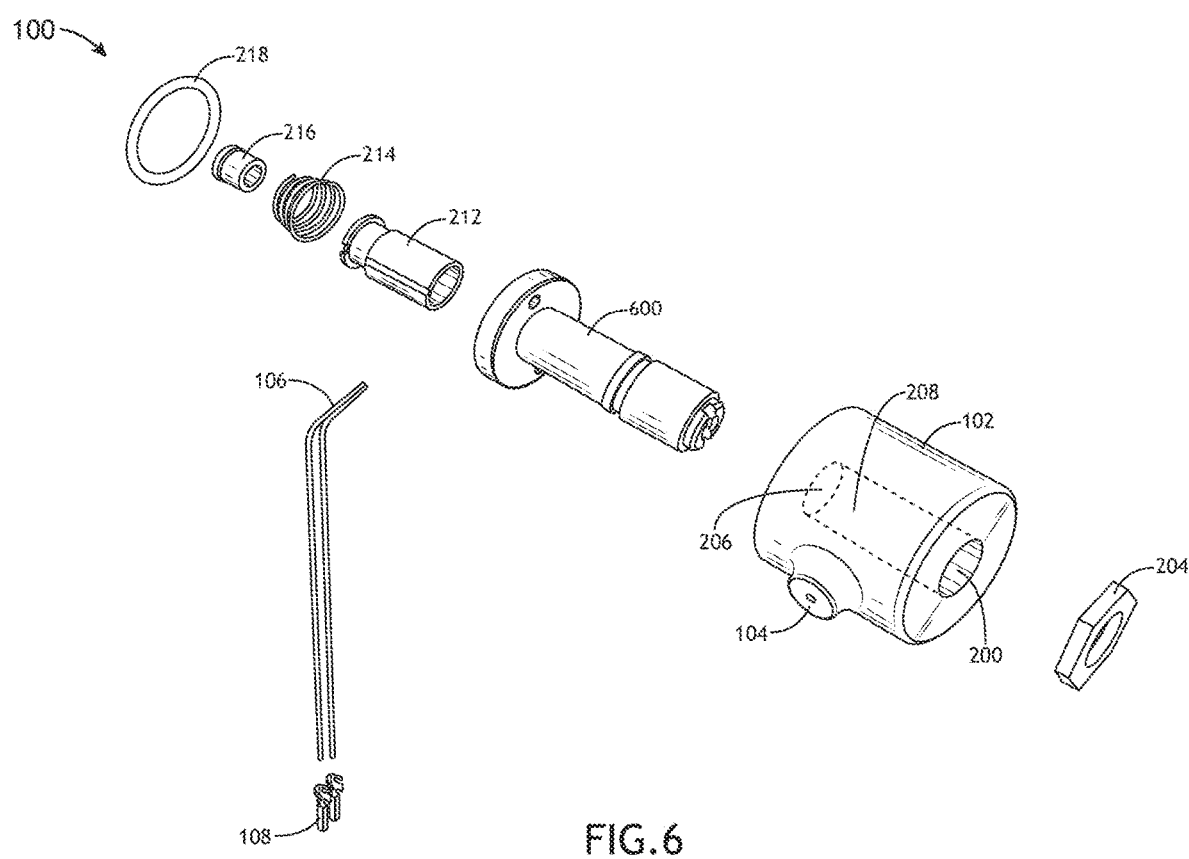
FIG. 6 is an exploded view of an exemplary embodiment of a solenoid valve for an aircraft galley brewing apparatus according to the inventive concepts disclosed herein.

FIG. 6 illustrates an exemplary embodiment of the solenoid valve 100 according to the inventive concepts disclosed herein.

The solenoid valve 100 may include a stem core tube 600. It is noted herein the stem core tube 600 may include one or more physical characteristics of the stem 202 and/or the core tube 210. As such, any description of the stem 202 and/or the stem core tube 210 may be extended to the stem core tube 600.

The stem core tube 600 may be inserted into the coil 102 via the hole 206. For example, the hole 206 may be located on an end of the coil 608 such that the stem core tube 600 is co-axial with the coil 102 when inserted. The stem core tube 600 may pass through the channel 208 and exit the coil 102 via the hole 200. The stem core tube 600 may be held in place within the coil 102 via the retainer 204. In this regard, the stem core tube 600 may be considered a fixed core of the solenoid valve 100 (or a portion thereof).

The core 212 (or a portion thereof) may be inserted into an end of the stem core tube 600. For example, an outer diameter of the core 212 (or a portion thereof) may be less than an inner diameter of the stem core tube 600 (or a portion thereof). By way of another example, the core 212 may be co-axial with the stem core tube 600 when inserted.

Figure 7:
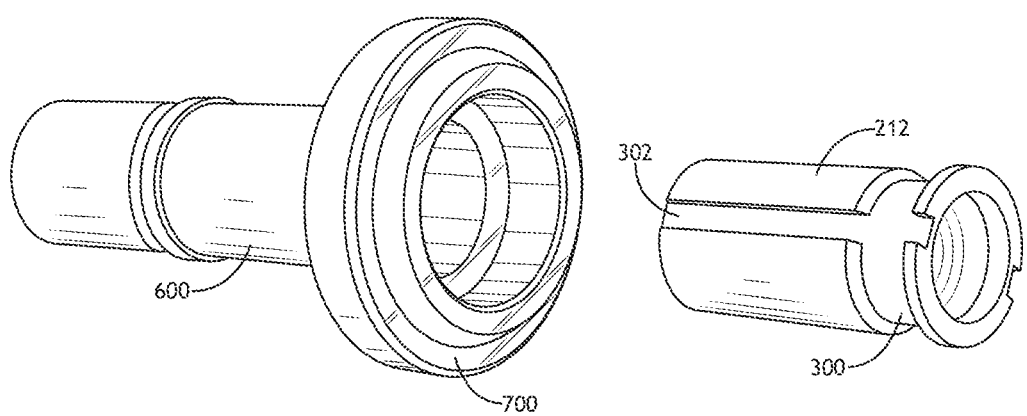
FIG. 7 is a partial exploded view of an exemplary embodiment of a solenoid valve for an aircraft galley brewing apparatus according to the inventive concepts disclosed herein.

FIG. 7 illustrates an exemplary embodiment of the stem core tube 600 and the core 212 of the solenoid valve 100 according to the inventive concepts disclosed herein.

The stem core tube 600 may include a first section with a first exterior diameter and an additional section with an additional exterior diameter. For example, the first section may be a tube and the second section may be a flange. The stem core tube may include a groove 700. For example, the groove 700 may be inset in the additional section including the additional exterior diameter a selected depth. It is noted herein, however, that the core tube 210 may include a single exterior diameter. Therefore, the above description should not be interpreted as a limitation on the present disclosure but merely an illustration.

Figure 8:
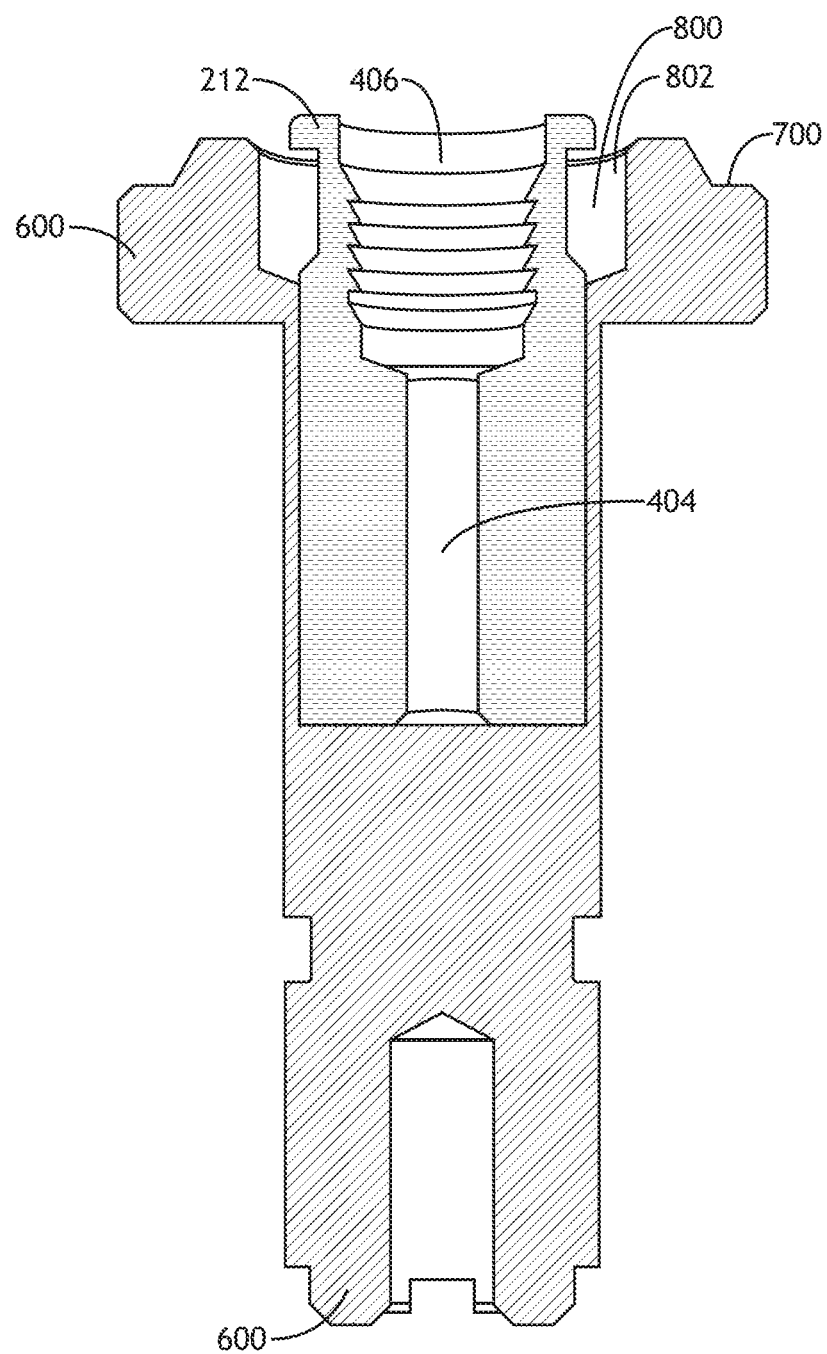
FIG. 8 is a partial cross-section view of an exemplary embodiment of a solenoid valve for an aircraft galley brewing apparatus according to the inventive concepts disclosed herein.

FIG. 8 illustrates an exemplary embodiment of the stem core tube 600 and the core 212 of the solenoid valve 100 according to the inventive concepts disclosed herein.

The stem core tube 600 may include a channel 800. The channel 800 may include a first interior diameter and an additional interior diameter. For example, the additional interior diameter may be larger than the first interior diameter. By way of another example, the additional interior diameter may be at the end of the stem core tube 600 where the core 212 is inserted into the stem core tube 600. For instance, the additional interior diameter of the stem core tube 600 may be large enough that there is a gap or space 802 between the stem core tube 600 and the core 212 for a length of the core 212 within a section of the stem core tube 600 including the additional diameter. It is noted herein, however, that the stem core tube 600 may include a single interior diameter. Therefore, the above description should not be interpreted as a limitation on the present disclosure but merely an illustration.

Figure 9:
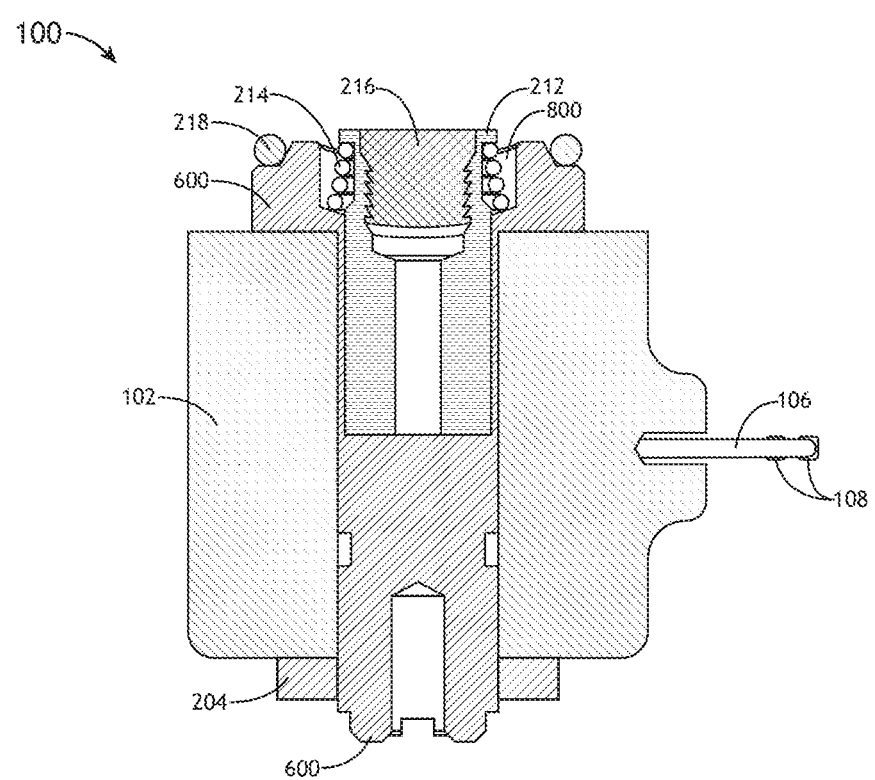
FIG. 9 is a cross-section view of an exemplary embodiment of a solenoid valve for an aircraft galley brewing apparatus according to the inventive concepts disclosed herein.

FIG. 9 illustrates an exemplary embodiment of the solenoid valve 100 according to the inventive concepts disclosed herein.

The spring 214 may be inserted into the gap or space 802 between the stem core tube 600 and the core 212 for the length of the core 212 within the section of the stem core tube 600 including the additional interior diameter. The seal 218 may be seated within the groove 700 inset within the stem core tube 600. For example, the seal 218 may be seated within the groove 700 and positioned between the core tube 210 and a manifold, where the solenoid valve 100 is installed on the manifold.

The core 212 may move within the stem core tube 600. For example, the core 212 may be magnetic, such that the core 212 is provided with a force when the solenoid valve 100 is provided with an electrical current that is converted to a magnetic field. In turn, the force provided to the core 212 may directly or indirectly change the position of the solenoid valve 100 (e.g., to open, closed, diverting, or the like). Movement of the core 212 within the stem core tube 600 may open, close, and/or divert fluid flow to fluid channels. It is noted herein that one or more of the set of one or more grooves 302, the channel 800, the gap or space 802, and/or the channel 404 may be configured to direct fluid through the solenoid valve 100.

The solenoid valve 100 may include one or more internal seals. For example, the one or more internal seals may be compatible with a fluid that is directed through the solenoid valve 100, as the one or more internal seals of the solenoid valve 100 may be exposed to the fluid.

One or more components of the solenoid valve 100 may be fabricated from a material compatible with a fluid that is directed through the solenoid valve 100, as the one or more components of the solenoid valve 100 may be exposed to the fluid. For example, the material may include, but is not limited to, a metal (e.g., brass, stainless steel, aluminum, or the like) or a non-metal (e.g., plastic, rubber). The material may include an iron-based stainless steel. For example, the stainless steel may be a ferritic stainless steel, an austenitic stainless steel, or any type of stainless steel known in the art. For instance, the ferritic stainless steel may include a 430 stainless steel (e.g., 430F, 430FR, or the like). In addition, the stainless steel may be a 434 stainless steel (e.g., 434F, or the like), which includes increased percentages of chromium and molybdenum in its composition as compared to 430 stainless steel.

Fabricating the one or more components of the solenoid valve 100 from a ferritic stainless steel may result in the one or more components being movable by the force provided to the solenoid valve 100 when electrical energy is converted to a magnetic field by the solenoid valve 100. In addition, fabricating the one or more components of the solenoid valve 100 from an austenitic stainless steel may result in the one or more components not being affected by the magnetic field.

Traditionally, solenoid valves used in aircraft and aerospace applications include one or more components fabricated from 430 stainless steel. Cleaning agents and sanitation agents used in the aircraft and aerospace applications may cause and/or accelerate corrosion in the one or more components fabricated from the 430 stainless steel when run through the solenoid valves. For example, the cleaning agents and sanitation agents may include a 0.03% sodium hypochlorite (e.g., bleach) solution.

A first accelerated corrosion test was performed to illustrate the corrosive effect of a 0.03% sodium hypochlorite solution on components fabricated (e.g., machined and cleaned) from 430 stainless steel versus 434 stainless steel. The components fabricated from the 430 stainless steel or the 434 stainless steel were treated with either (1) no corrosion prevention processes, (2) a passivation process (e.g., application of a light coat of a protective material such as a metal oxide to a surface), (3) an electro-polishing process (e.g., the removal of protrusions from a surface to smooth the surface), or (4) the passivation process and the electro-polishing process. The results of the first test are provided in Tables 1 and 2, where a 0/10 score for corrosion represents a low level of corrosion and a 10/10 score for corrosion represents a high level of corrosion.

TABLE 2

| Sample | Stainless Steel | Protection Process One | Protection Process Two | Corrosion at 97.6 hours | Corrosion at 130.2 hours |
|---|---|---|---|---|---|
| A | 430F | — | — | External 10/10 Internal 8/10 | — |
| B | 430F | Passivated | — | External 5/10 Internal 2/10 | External 8/10 Internal 4/10 |
| C | 430F | — | Electro-Polished | External 1/10 Internal 0/10 | External 1/10 Internal 1/10 |
| D | 430F | Passivated | Electro-Polished | External 0/10 Internal 0/10 | External 1/10 Internal 1.5/10 |
| E | 434F | — | — | External 10/10 Internal 8/10 | — |
| F | 434F | Passivated | — | External 0/10 Internal 1/10 | External 0.5/10 Internal 1/10 |
| G | 434F | — | Electro-Polished | External 0.5/10 Internal 0/10 | External 0.5/10 Internal 0/10 |
| H | 434F | Passivated | Electro-Polished | External 0/10 Internal 0/10 | External 0/10 Internal 0/10 |

As illustrated by the ranking of the results of the accelerated corrosion test provided in Tables 1 and 2, a component fabricated from 434 stainless steel that is passivated and electro-polished (Sample H) showed the least amount of corrosion, followed by a component fabricated from 434 stainless steel that is electro-polished (Sample G), a component fabricated from 434 stainless steel that is passivated (Sample F), a component fabricated from 430 stainless steel that is passivated and electro-polished (Sample D), a component fabricated from 430 stainless steel that is electro-polished (Sample C), and finally a component fabricated from 430 stainless steel that is passivated (Sample B).

Based on the results of the first accelerated corrosion test, an additional accelerated corrosion test was performed to illustrate the corrosive effect of a 0.03% sodium hypochlorite solution to components fabricated (e.g., machined and cleaned) from either 430 stainless steel or 434 stainless steel. As with the first test, the components fabricated from the 430 stainless steel or the 434 stainless steel were treated with either (1) no corrosion prevention processes, (2) a passivation process, (3) an electro-polishing process, or (4) the passivation process and the electro-polishing process. The results of the additional test are provided in Tables 3-5, where a 0/10 score for corrosion represents a low level of corrosion and a 10/10 score for corrosion represents a high

TABLE 1

| Sample | Rank | Stainless Steel | Protection Process One | Protection Process Two | Corrosion at 51.1 hours | Corrosion at 66.3 hours |
|---|---|---|---|---|---|---|
| A | — | 430F | — | — | External 9/10 | External 10/10 Internal 8/10 |
| B | 6 | 430F | Passivated | — | External 4/10 | External 5/10 Internal 2/10 |
| C | 5 | 430F | — | Electro-Polished | External 1/10 | External 1/10 Internal 0/10 |
| D | 4 | 430F | Passivated | Electro-Polished | External 0/10 | External 0/10 Internal 0/10 |
| E | — | 434F | — | — | External 8/10 | External 10/10 Internal 8/10 |
| F | 3 | 434F | Passivated | — | External 0/10 | External 0/10 Internal 1/10 |
| G | 2 | 434F | — | Electro-Polished | External 0.5/10 | External 0.5/10 Internal 0/10 |
| H | 1 | 434F | Passivated | Electro-Polished | External 0/10 | External 0/10 Internal 0/10 | level of corrosion. It is noted herein the sample labels are the same between the first accelerated corrosion test and the additional accelerated corrosion test, for ease of data comparison between the accelerated corrosion tests.

TABLE 3

| Sample | Rank | Stainless Steel | Protection Process One | Protection Process Two | Corrosion at 35.5 hours |
|---|---|---|---|---|---|
| C | 5 | 430F | — | Electro-Polished | External 1/10 Internal 0.5/10 (2/5 slight) |
| D | 3 | 430F | Passivated | Electro-Polished | External 0/10 Internal 0.5/10 (3/5 slight) |
| F | 2 | 434F | Passivated | — | External 0.5/10 Internal 0.5/10 (2/5 slight) |
| G | 4 | 434F | — | Electro-Polished | External 1/10 Internal 0.5/10 (2/5 slight) |
| H | 1 | 434F | Passivated | Electro-Polished | External 0/10 Internal 0/10 |

TABLE 4

| Sample | Stainless Steel | Protection Process One | Protection Process Two | Corrosion at 49.7 hours | Corrosion at 64.7 hours |
|---|---|---|---|---|---|
| C | 430F | — | Electro-Polished | External 2/10 Internal 1/10 (5/5 slight) | External 2/10 Internal 1.5/10 (5/5 slight) |
| D | 430F | Passivated | Electro-Polished | External 0/10 Internal 0.5/10 (3/5 slight) | External 0.5/10 Internal 1/10 (4/5 slight) |
| F | 434F | Passivated | — | External 0.5/10 Internal 0.5/10 (2/5 slight) | External 0.5/10 Internal 0.5/10 (2/5 slight) |
| G | 434F | — | Electro-Polished | External 1/10 Internal 0.5/10 (3/5 slight) | External 1.5/10 Internal 1/10 (3/5 slight) |
| H | 434F | Passivated | Electro-Polished | External 0/10 Internal 0/10 | External 0/10 Internal 0/10 |

TABLE 5

| Sample | Stainless Steel | Protection Process One | Protection Process Two | Corrosion at 92.3 hours | Corrosion at 191 hours |
|---|---|---|---|---|---|
| C | 430F | — | Electro-Polished | External 3/10 Internal 2.5/10 (5/5 slight) | External 6/10 Internal 3.5/10 |
| D | 430F | Passivated | Electro-Polished | External 0.5/10 Internal 1.5/10 (4/5 slight) | External 1.5/10 Internal 3/10 |
| F | 434F | Passivated | — | External 0.5/10 Internal 1/10 (3/5 slight) | External 1.5/10 Internal 1/10 |
| G | 434F | — | Electro-Polished | External 2.5/10 Internal 1/10 (4/5 slight) | External 3.5/10 Internal 1.5/10 |
| H | 434F | Passivated | Electro-Polished | External 0/10 Internal 0/10 | External 0/10 Internal 0/10 |

As illustrated by the ranking of the results of the additional accelerated corrosion test provided in Tables 3-5, a component fabricated from 434F stainless steel that is passivated and electro-polished (Sample H) showed the least amount of corrosion, followed by a component fabricated from 434 stainless steel that is passivated (Sample F), a component fabricated from 430 stainless steel that is passivated and electro-polished (Sample D), a component fabricated from 434 stainless steel that is electro-polished (Sample G), and finally a component fabricated from 430 stainless steel that is electro-polished (Sample C).

Based on the results of the accelerated corrosion tests, components fabricated from 430 stainless steel exhibited corrosion after two days and exhibited extensive corrosion after seven days. In contrast, components fabricated from 434 stainless steel and treated with both the passivation process and the electro-polishing process exhibited far less (or, in some cases, negligible) corrosion over the same period of time and in the same testing conditions.

Comparison of the results for components fabricated from 434 stainless steel and 430 stainless steel indicates that the increased chromium and molybdenum within the composition of the 434 stainless steel increases the corrosion resistance of the 434 stainless steel. In addition, treating the components with one or more of the passivation process and/or the electro-polishing process also increased the corrosion resistance of the components, with the effect of the processes being additive. As such, components fabricated from the 434 stainless steel and treated with both the passivation and the electro-polishing processes (e.g., Sample H) illustrated the greatest resistance to corrosion caused by the 0.03% sodium hypochlorite solution of all test samples.

One or more of the stem 202, the core tube 210, the core 212, and/or the stem core tube 600 may be fabricated from a stainless steel. Based on the results from the accelerated corrosion tests, the greatest resistance to corrosion may be achieved if one or more of the stem 202, the core tube 210, the core 212, and/or the stem core tube 600 are fabricated from 434 stainless steel and treated with both a passivation process and an electro-polishing process. It is believed that a stem 202, a core tube 210, a core 212, and/or a stem core tube 600 fabricated from 434 stainless steel and treated with both a passivation process and an electro-polishing process will last up to twenty years, even when cleaned with a 0.03% sodium hypochlorite solution.

In addition, based on the results from the accelerated corrosion tests, increased resistance to corrosion may be achieved in one or more of the stem 202, the core tube 210, the core 212, and/or the stem core tube 600 if fabricated from 434 stainless steel and treated with a passivation process. It is noted herein that treating only with the passivation process is cheaper than treating with both the passivation process and the electro-polishing process, making the sole treatment suitable for bulk production and/or for the production of components not requiring quite the extended lifespan.

Further, based on the results from the accelerated corrosion tests, increased resistance to corrosion may be achieved in one or more of the stem 202, the core tube 210, the core 212, and/or the stem core tube 600 if fabricated from 434 stainless steel and treated with an electro-polishing process. It is noted herein that treating only with the electro-polishing process is cheaper than treating with both the passivation process and the electro-polishing process, making the sole treatment suitable for bulk production and/or for the production of components not requiring quite the extended lifespan.

Although the present disclosure is directed to the stem 202, the core tube 210, and/or the stem core tube 600 of the solenoid valve 100 being fabricated from a ferritic stainless steel including 434 stainless steel, it is noted herein that to the stem 202, the core tube 210, and/or the stem core tube 600 may be fabricated from a different type of stainless steel. For example, the stem 202, the core tube 210, and/or the stem core tube 600 may be fabricated from an austenitic stainless steel including, but not limited to, 316 stainless steel, 304 stainless steel, or the like. In this regard, to the stem 202, the core tube 210, and/or the stem core tube 600 may not be magnetic, such that the effect of the magnetic field on the core 212 is not altered. Therefore, the above description should not be interpreted as a limitation on the present disclosure but merely an illustration.

It is noted herein the stem 202, the core tube 210, and/or the stem core tube 600 fabricated from an austenitic stainless steel (e.g., 304 stainless steel, 316 stainless steel, or the like) may be coated with 434 stainless steel to increase corrosion, without significantly altering the effect of the magnetic field on the core 212. Therefore, the above description should not be interpreted as a limitation on the present disclosure but merely an illustration.

Although the present disclosure is directed to performing the one or more corrosion prevention processes (e.g., passivation and/or electro-polishing) on one or more components of the solenoid valve 100 (e.g., the stem 202, the core tube 210, the core 212, and/or the stem core tube 600), where the one or more components are fabricated from 434 stainless steel, it is noted herein the one or more corrosion prevention processes may be performed on one or more components of the solenoid valve 100 fabricated from a different type of stainless steel. For example, the one or more corrosion prevention processes may be performed on one or more components of the solenoid valve 100 fabricated from a 430 stainless steel. By way of another example, the one or more corrosion prevention processes may be performed on one or more components of the solenoid valve 100 fabricated from an austenitic stainless steel (e.g., 304 stainless steel, 316 stainless steel, or the like). In this regard, the 430 stainless steel components are afforded increased resistance to corrosion. Therefore, the above description should not be interpreted as a limitation on the present disclosure but merely an illustration.

Figure 10:
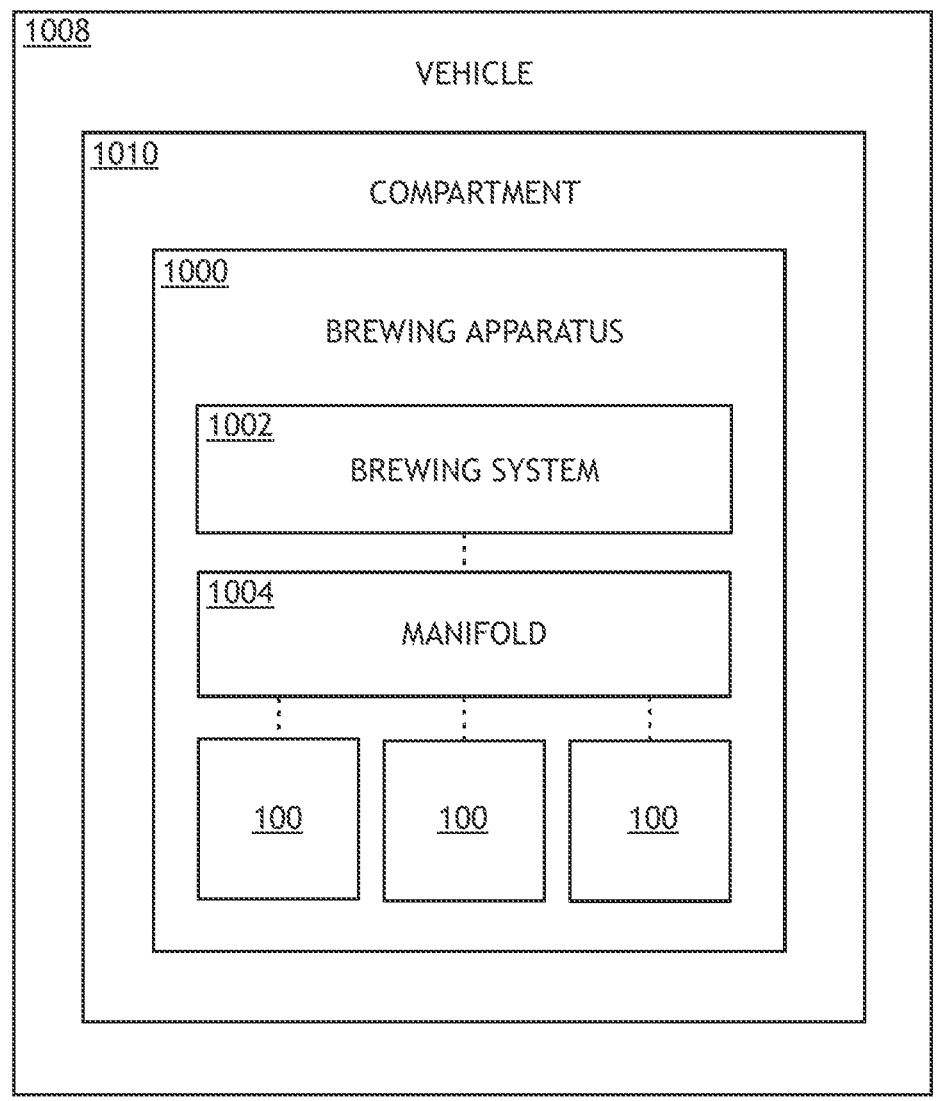
FIG. 10 illustrates a diagrammatic illustration of an exemplary embodiment of a solenoid valve for an aircraft galley brewing apparatus according to the inventive concepts disclosed herein.

FIG. 10 illustrates a diagrammatic illustration of an exemplary embodiment of the solenoid valve 100 according to the inventive concepts disclosed herein.

The solenoid valve 100 may be configured to operate in a brewing apparatus 1000. The solenoid valve 100 may be coupled to one or more components of a brewing system 1002 of the brewing apparatus 1000. The brewing system 1002 may include one or more heating subsystems with any number of heating components known in the art (e.g., one or more heating elements, one or more heat-resistant components, or the like), one or more plumbing subsystems with any number of plumbing components known in the art (e.g., fluidic components including one or more pipes and pipe couplers, one or more tubes and tube couplers, or the like), and/or one or more electrical subsystems with any number of electrical components known in the art (e.g., one or more wire harnesses, one or more terminal blocks, one or more sensors, one or more controllers including processors and/or memory, one or more user interfaces, or the like). It is noted herein the various systems and subsystems within the brewing apparatus 1000 may share any number of components.

The brewing apparatus 1000 may include one or more solenoid valves 100. For example, the one or more solenoid valves 100 may be mounted to and/or otherwise arranged on a manifold 1004. For example, the one or more solenoid valves 100 may be coupled to the brewing system 1002 via the manifold 1004. The one or more solenoid valves 100 may open, close, and/or divert fluid from one or more fluid tanks in the brewing apparatus 1000 to a specific plumbing subsystem of the brewing apparatus 1000. For example, the brewing apparatus 1000 may include a solenoid valve 100 for each plumbing subsystem of the brewing apparatus 1000. For instance, the brewing apparatus 1000 may include a solenoid valve 100 coupled to the brewing system 1002, the brewing system 1002 including a plumbing subsystem configured to direct a fluid (e.g., heated water) through a coffee ground filter pack to brew coffee into a carafe or server. In addition, the brewing apparatus 1000 may include a solenoid valve 100 coupled to a plumbing subsystem configured to bypass the brewing system 1002 and direct the fluid (e.g., heated water) directly into the carafe or server to prevent cross-contamination. Further, the brewing apparatus 1000 may include a solenoid valve 100 coupled to a plumbing subsystem configured to bypass the brewing system 1002 and direct the fluid (e.g., heated water or cold water) through a faucet of the brewing apparatus 1000.

It is noted herein the one or more solenoid valves 100 may be coupled directly to the brewing system 1002 without the need for the manifold 1004. Therefore, the above description should not be interpreted as a limitation on the present disclosure but merely an illustration.

The brewing apparatus 1000 may be installed in and/or configured or dimensioned to fit within any type of vehicle 1008 known in the art. For example, the vehicle 1008 may be any air, land, or water-based personal equipment or vehicle; any air, land, or water-based commercial equipment or vehicle; any air, land, or water-based military equipment or vehicle known in the art. For instance, the vehicle 1008 may be a passenger aircraft. The vehicle 1008 may include a compartment 1010 in which the brewing apparatus is installed and/or configured or dimensioned to fit. For example, the compartment 1010 may include a compartment in a galley of a passenger aircraft. The vehicle 1008 may include one or more on-board systems (e.g., water storage tanks, water sanitation systems, controllers in communication with the brewing apparatus, or the like) coupled to the brewing apparatus 1000.

Where the vehicle 1008 is an aircraft, the brewing apparatus 1000 and/or select components of the brewing apparatus 1000 may be configured in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

It is noted herein the brewing apparatus 1000 may be installed directly within the vehicle 1008 (e.g., not installed and/or configured or dimension to fit the compartment 1010 of the vehicle 1008). In addition, it is noted herein the brewing apparatus 1000 may be a standalone device configured to operate within a home or a business. For example, the brewing apparatus 1000 may be a device sold for commercial or industrial use in either a home or a business. In this regard, the brewing apparatus 1000 may not be installed and/or configured or dimensioned to fit within the compartment 1010 of the vehicle 1008. Therefore, the above description should not be interpreted as a limitation on the present disclosure but merely an illustration.

As will be appreciated from the above embodiments, the inventive concepts disclosed herein are directed to a solenoid valve for a brewing apparatus, where the brewing apparatus is configured to couple to and operate in an aircraft galley, where the solenoid valve includes one of more components fabricated via one or more corrosion-prevention processes to prevent corrosion of the components by cleaning agents and sanitation agents and reduce cost of the solenoid valve.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A solenoid valve for an aircraft galley brewing apparatus, comprising:
   a coil including one or more electrical leads, the one or more electrical leads being configured to provide the coil with an electric current, the coil being configured to convert the electric current to a magnetic field;
   a stem core tube, at least a portion of the stem core tube being insertable within a coil channel; and
   a core, at least a portion of the core being insertable within an end of the stem core tube, the core being moveable within the stem core tube via the magnetic field,
   at least one of the stem core tube or the core being fabricated from 434 stainless steel and treated with one or more corrosion prevention processes, the one or more corrosion prevention processes including a passivation process,
   the solenoid valve being installable within the brewing apparatus and couplable to one or more components of the brewing apparatus, the brewing apparatus being dimensioned to fit within a compartment of the aircraft galley.

2. The solenoid valve in claim 1, the one or more corrosion prevention processes including the passivation process and an electro-polishing process.

3. The solenoid valve in claim 1, further comprising:
   a spring insertable within a gap between an exterior surface of the core and an interior surface of the stem core tube,
   the core being movable to an open position via the magnetic field when the coil is provided with the electric current by the one or more electrical leads,
   the core being movable to a closed position via the spring when the coil is not provided with the electric current by the one or more electrical leads.

4. A solenoid valve for an aircraft galley brewing apparatus, comprising:
   a coil including one or more electrical leads, the one or more electrical leads being configured to provide the coil with an electric current, the coil being configured to convert the electric current to a magnetic field;
   a core tube, at least a portion of the core tube being insertable within a coil channel;
   a stem, at least a portion of the stem being insertable within the coil channel, at least a portion of the stem being insertable within an end of the core tube; and
   a core, at least a portion of the core being insertable within an additional end of the core tube, the core being moveable within the core tube via the magnetic field, at least one of the core tube or the core being fabricated from 434 stainless steel and treated with one or more corrosion prevention processes, the one or more corrosion prevention processes including a passivation process,
   the solenoid valve being installable within the brewing apparatus and couplable to one or more components of the brewing apparatus, the brewing apparatus being dimensioned to fit within a compartment of the aircraft galley.

5. The solenoid valve in claim 4, the one or more corrosion prevention processes including the passivation process and an electro-polishing process.

6. The solenoid valve in claim 4, further comprising:
   a spring insertable within a gap between an exterior surface of the core and an interior surface of the core tube,
   the core being movable to an open position via the magnetic field when the coil is provided with the electric current by the one or more electrical leads,
   the core being movable to a closed position via the spring when the coil is not provided with the electric current by the one or more electrical leads.

7. A solenoid valve, comprising:
   a coil including one or more electrical leads, the one or more electrical leads being configured to provide the coil with an electric current, the coil being configured to convert the electric current to a magnetic field;
   a stem core tube, at least a portion of the stem core tube being insertable within a coil channel; and
   a core, at least a portion of the core being insertable within an end of the stem core tube, the core being moveable within the stem core tube via the magnetic field,
   at least one of the stem core tube or the core being fabricated from 434 stainless steel and treated with one or more corrosion prevention processes, the one or more corrosion prevention processes including a passivation process.

8. The solenoid valve in claim 7, the one or more corrosion prevention processes including the passivation process and an electro-polishing process.

9. The solenoid valve in claim 7, further comprising:
a spring insertable within a gap between an exterior surface of the core and an interior surface of the stem core tube,
the core being movable to an open position via the magnetic field when the coil is provided with the electric current by the one or more electrical leads,
the core being movable to a closed position via the spring when the coil is not provided with the electric current by the one or more electrical leads.

10. A solenoid valve, comprising:
a coil including one or more electrical leads, the one or more electrical leads being configured to provide the coil with an electric current, the coil being configured to convert the electric current to a magnetic field;
a core tube, at least a portion of the core tube being insertable within a coil channel;
a stem, at least a portion of the stem being insertable within the coil channel, at least a portion of the stem being insertable within an end of the core tube; and
a core, at least a portion of the core being insertable within an additional end of the core tube, the core being moveable within the core tube via the magnetic field,
at least one of the core tube or the core being fabricated from 434 stainless steel and treated with one or more corrosion prevention processes, the one or more corrosion prevention processes including a passivation process.

11. The solenoid valve in claim 10, the one or more corrosion prevention processes including the passivation process and an electro-polishing process.

12. The solenoid valve in claim 10, further comprising:
a spring insertable within a gap between an exterior surface of the core and an interior surface of the core tube,
the core being movable to an open position via the magnetic field when the coil is provided with the electric current by the one or more electrical leads,
the core being movable to a closed position via the spring when the coil is not provided with the electric current by the one or more electrical leads.

* * * * *